United States Patent

Richart

[15] 3,640,747

[45] Feb. 8, 1972

[54] METHOD OF REDUCING SANDINESS IN VINYL COATINGS

[72] Inventor: Douglas Steven Richart, Berks County, Pa.

[73] Assignee: The Polymer Corporation, Reading, Pa.

[22] Filed: Sept. 12, 1968

[21] Appl. No.: 759,507

Related U.S. Application Data

[63] Continuation of Ser. No. 528,366, July 18, 1966, abandoned.

[52] U.S. Cl. ..................117/21, 117/128.4, 117/132 C, 117/161 UZ, 117/161 H, 117/161 UF, 117/232
[51] Int. Cl. ..................................B44d 1/094, B44d 1/46
[58] Field of Search .............117/21, 128.4, 161 U, 161 UH, 117/232, 132 C

[56] References Cited

UNITED STATES PATENTS

| | | | |
|---|---|---|---|
| 3,136,651 | 6/1964 | Spessard | 117/21 |
| 3,232,780 | 2/1966 | Kupits | 117/21 |
| 3,277,042 | 10/1966 | Richart | 117/21 |
| 3,025,267 | 3/1962 | Calfee | 117/128.4 |
| 3,072,597 | 1/1963 | Lavin et al. | 117/232 |
| 3,137,666 | 6/1964 | Lox et al. | 117/132 C |
| 3,247,167 | 4/1966 | Jason et al. | 117/132 C |
| 3,313,760 | 4/1967 | Barnes et al. | 117/232 |
| 3,313,761 | 4/1967 | Barnes et al. | 117/232 |
| 3,350,332 | 10/1967 | Hardy et al. | 117/128.4 |
| 3,376,246 | 4/1968 | Valentine et al. | 117/132 C |

Primary Examiner—William D. Martin
Assistant Examiner—Raymond M. Speer
Attorney—Synnestvedt & Lechner

[57] ABSTRACT

A method of reducing sandiness in a vinyl coating produced by a heat fusion coating process. A soluble organic tin compound is included as a component of the vinyl coating composition.

3 Claims, No Drawings

METHOD OF REDUCING SANDINESS IN VINYL COATINGS

This application is a continuation of application Ser. No. 528,366, filed July 18, 1966, now abandoned.

This invention relates to the reduction of sandiness in vinyl coatings. Specifically, it relates to the use of an organic tin compound in a vinyl coating composition.

As a class, the vinyl resins constitute one of the more important synthetic resinous materials useful in the fabrication of articles and in the application of protective and decorative coatings to base materials. Their importance results from a combination of excellent features of which the following are representative: they are tough, durable, and fairly resistant to chemical attack; they are relatively inexpensive as compared with other resins having comparable properties; and they conveniently may be used in almost any of the common plastic fabrication techniques.

It should be understood that as used herein, the term "vinyl resins" is meant to include the various polyvinyl chlorides as well as copolymers of polyvinyl chloride, mixtures of polyvinyl chloride and polyvinyl chloride copolymers, and mixtures of any of the above with minor portions (e.g., less than 20 percent) of other resin systems. Examples of these copolymers are copolymers of vinyl chloride and vinyl formate, vinyl acetate, vinylidene chloride, vinyl alkyl ethers, maleic esters, fumaric esters, acrylic esters, or acrylonitrile. Examples of the other resin systems referred to are hydrocarbon resins, acrylics, rosin esters, abietic acid, abietic acid derivatives, and the like. Thus, while the term "vinyl" will ordinarily be used herein for convenience, it is to be understood that it includes the above copolymers, mixtures of copolymers, and mixtures including other resin systems.

The vinyl resins with which this invention is especially concerned are the medium high to high molecular weight vinyls. These medium high to high molecular weight vinyls may be defined as those having a minimum specific viscosity of about 0.33 as determined by ASTM test D1243-60, method B, and are desirable for use in coating compositions if special properties, such as deformation under load, are important. An example of such an application is the coating of dish racks for use in automatic dishwashers. The coating on these wire baskets must not only bear up against point contact with heavy plates and kitchen utensils, but it must do so at elevated temperatures extending to 250° F. and above.

In preparing vinyls for use in heat fusion processes, it is conventional to formulate them with other materials such as plasticizers, stabilizers, filler materials such as pigments and extenders, and the like. When so formulated and reduced to a dry, free-flowing, pulverulent state, these coating materials may be used in the various heat fusion coating processes including, for example, flame spraying, electrostatic spraying, dusting, cloud chamber, fluidized bed coating, and the like. These coating processes are similar to each other in that the coating materials are distributed over a substrate while in pulverulent form and then caused to flow out and fuse into a continuous coating layer by heating the coating materials to above their melting point. It is readily apparent that these heat fusion processes are distinct from those vinyl forming processes wherein both heat and pressure are relied upon to cause the vinyl to flow, such as calendaring, pressure casting and extrusion, as well as from those vinyl coating processes wherein the coating material is distributed over the substrate while in the form of a liquid, such as a plastisol or an organisol.

In order to provide heat to cause the pulverulent coating materials initially to adhere to the substrate and then fuse into a continuous protective layer, it is conventional to heat the substrate to a temperature above the melting point of the coating materials prior to contact therewith. This is known as "preheating." In some instances, in order to complete the fusion of the coating materials after they have been distributed over the surface of the heated substrate, it is necessary to provide additional heat. This is known as "postheating." It can readily be understood that the need for postheating will depend to a large degree upon the mass and heat capacity of the substrate. For example, a coating applied to a thick-walled iron pipe might not require postheating whereas a coating applied to wire goods well might. Also, in the special case of electrostatic spraying coating processes, the finely divided coating materials are frequently distributed over a cold substrate by means of electrostatic forces and then the finely divided materials adhering to the substrate are caused to flow out by heat applied solely in a postheat oven.

When using the above described medium high to high molecular weight vinyls in heat fusion coating processes that require postheating, a condition known as "sanding" is frequently observed. This condition may be defined as the occurrence of infusible particles that appear in the form of small granules or sandlike particles on the surface of the finished coating. Once formed, these small sandlike particles are believed to be infusible since they no longer will fuse or flow out even at temperatures greatly in excess of the melting point of the coating materials. To this extent, they are clearly distinguishable from so-called "sugar coatings" that are somewhat similar in appearance but which will fuse and flow out into a smooth layer by further heating of the coating in a postheat oven. To repeat, no matter how much heat is applied, a sandy surface will not flow out into a smooth layer. A sandy surface is commercially undesirable since it detracts from the appearance of the coating, the roughened surfaces will collect dirt and may be hard to clean, and the roughened surface may cause abrasion when brought into contact with various other articles.

Accordingly, it is the object of this invention to provide vinyl coating compositions that are substantially free from sanding when used in heat fusion coating processes.

Briefly, this and other objects of this invention are achieved by the proper selection of the stabilizer that is used in formulating the vinyl coating composition. Particularly, it has now been discovered that sandiness may be substantially avoided if stabilizers are selected from those in which the metallic component of the stabilizer is tin or other similar metal such as germanium.

While the exact nature and causes of the occurrence of sandiness are not understood, it has been observed that the tendency to develop a sandy surface is intensified when a number of coated substances are simultaneously placed in a postheat oven. For example, if a single substrate is coated with finely divided particles and the fusion is completed in a postheat oven, sandiness generally is not observed. However, when a number of similarly coated parts are placed in the same postheat oven all at the same time, it is not unusual for sandiness to develop. For this reason, it has been theorized that gaseous products may be evolved from the surface of the coating materials while they are detained in the postheat oven, which gaseous products may then react with other ingredients of the coating material to form localized areas of infusible particles. While the nature of the hypothesized gaseous products have not been identified, it now has been discovered that if such products do indeed exist, they apparently react with, or are catalyzed in their action by, the presence of certain stabilizers included in the formulated vinyl coating resins. This is substantiated by the discovery that vinyl coating materials that are quite subject to sanding will not sand if the stabilizer is removed therefrom. It can be appreciated that this does not present a practical solution to the problem since it is essential to use stabilizers in commercial vinyl formulations to prevent undue degradation.

It has now been found that the occurrence of sandiness can be avoided if the stabilizer used in formulating the vinyl coating materials is an organic or inorganic salt of tin or similar element such as germanium. Conversely, when other common stabilizers known to the art such as those based upon lead, barium, cadmium, calcium and zinc, are used, it is often difficult to avoid the formation of sand.

In the following examples illustrating the utility of this invention, a vertical baffle was placed in a central portion of a standard electrically heated forced circulation convection oven. This baffle divided the oven into two separate parts which could communicate through a small 4 inch square window located at a central portion of the baffle. Due to the nature of the forced circulation through the oven, the baffle divided the oven into an upstream and downstream portion so that gases could be circulated from the upstream portion of the oven, through the window, and into the downstream portion. The oven was then heated to a temperature of 450° F., and a gas velocity of 1,400 to 1,600 ft./min. was established therein.

Six substrates were coated in the fluidized bed coating process with a standard vinyl coating composition as described below and were hung in the upstream side of the oven. Specimens to be tested were then preheated to 550° F. and dipped in a coating composition having the composition indicated in the examples for about 5 seconds to deposit a 12 to 15 mil coating over their surfaces. After the specimens were removed from the fluidized bed, they were immediately placed in the downstream side of the oven exactly 4 minutes after the six coated substrates had been placed in the oven. The specimens were allowed to remain in the oven under these conditions for 1 minute. These experiments were then repeated after the six coated substrates had been retained in the oven for 6, 8, 10, 12, and 14 minutes. By this means, the occurrence of sandiness was greatly accelerated and intensified due to the fact that any gaseous products evolved from six coated substrates remained in the oven, the greater was the possibility for the evolution of gaseous materials from the coating material.

All of the substrates, including the test specimens, were comprised of 4×5 inch pieces of intersecting welded wires such as are commonly used in the fabrication of dish racks.

The coating composition utilized to coat the six substrates placed in the upstream side of the oven was comprised of an intimate blend of the following materials (quantities are given in parts by the weight):

| | |
|---|---|
| PVC resin having a minimum specific viscosity of 0.33 as determined by ASTM test D1243—60, method B | 100 |
| Di-n-octyl-n-decyl phthalate | 60 |
| Epoxidized soya | 5 |
| Tio₂-CaCO₃ (pigment and filler) | 25 |
| Barium-cadmium stabilizer (Mark WS) | 6 |
| Organic chelating agent (Mark C) | 3 |

The test specimens were coated with an identical vinyl composition with the exception that the barium-cadmium stabilizer and the organic chelating agent were substituted for by the stabilizers as shown in the following table. Examples XIV and XV were performed separately from the other experiments and slight experimental variances are responsible for the differences between example II and Example XV. The results are indicated in the table as follows:

| Examples | Stabilizer Type | Trade Designation | Amount | Time in minutes that coated substrates were in oven prior to introduction of test specimens | | | | | |
|---|---|---|---|---|---|---|---|---|---|
| | | | | 4 | 6 | 8 | 10 | 12 | 14 |
| I | | No stabilizer used | | 0 | 0 | 0 | 0 | 0 | 0 |
| II | BaCd | {Mark WS<br>{Mark C | 6<br>3 | H | H | H | H | H | H |
| III | BaCd | Nuostab V-1008 | 10 | H | H | H | H | H | H |
| IV | Pb | Tribase EXL | 8 | S | S | S | S/M | S/M | S/M |
| V | Pb | Dythal XL | 8 | S | S | S | S/M | S/M | S/M |
| VI | CaZn | Mark 33 | 8 | S | M | H | H | H | H |
| VII | CaZn | Advastab CZ-11 | 6 | S | M | H | H | H | H |
| VIII | Sn | Mark X | 4 | 0 | 0 | 0 | 0 | 0 | 0 |
| IX | Sn | Advastab T-360 | 2 | 0 | 0 | 0 | 0 | 0 | 0 |
| X | Sn | Advastab TM-180 | 4 | 0 | 0 | 0 | 0 | 0 | 0 |
| XI | Sn | Advastab T-150 | 4 | 0 | 0 | 0 | 0 | 0 | 0 |
| XII | Sn | Advastab T-270 | 2 | 0 | 0 | 0 | 0 | 0 | 0 |
| XIII | Sn | Advastab T-5 | 4 | 0 | 0 | 0 | 0 | 0 | 0 |
| XIV | Sn | Mark 1038 | 4 | 0 | 0 | 0 | 0 | 0 | 0 |
| XV | BaCd | {Mark WS<br>{Mark C | 6<br>3 | 0 | 0 | 0 | S | H | H |

0 = None—No sandiness can be detected.
S = Slight—Sandiness can be detected by feel and close visual inspection.
M = Moderate—Sandiness can be observed without difficulty both by feel and visual inspection.
H = Heavy—Sandiness causes the coating to be very rough to the touch and is markedly present by visual observation.

The various stabilizers used in the above examples are identified as follows:
Sold by the Argus Chemical Co:
    Mark C—an organic phosphite chelating agent.
    Mark WS—a solid barium-cadmium organic complex.
    Mark 33—a fine white powder of a calcium-zinc organic complex.
    Mark X—a liquid alkyl-tin mercaptide.
    Mark 1038—dibutyl tin dilaurate.
Sold by the Advance Chemical Co.:
    Advastab T-360—a solid organo-tin sulfur-containing compound.
    Advastab TM-180—a liquid organo-tin complex containing no sulfur.
    Advastab CZ-11A—a solid calcium-zinc organic complex.
    Advastab T-5—a liquid organo-tin complex containing no sulfur.
    Advastab T-270—a solid dioctyl-tin sulfur containing compound.
    Advastab T-150—a dibutyl tin modified maleate ester.
Sold by Nuodex:
    Nuostab V-1008—a liquid organic barium-cadmium complex.
Sold by the National Lead Co.:
    Tribase EXL—a modified basic lead silicate/sulfate.
    Dythal XL—a dibasic lead phthalate.

the six coated substrates were caused to flow through the window and impinge directly upon the specimens. Due to the intensified nature of this test, evaluation of the coating material for its susceptibility to sanding was greatly facilitated.

It will be noted that the degree of sandiness tended to increase when the six coated substrates were detained in the oven for a longer period of time. This would seem consistent with the theoretical basis for this invention, as the longer the six coated substrates remained in the oven, the greater was the possibility for the evolution of gaseous materials from the coating material.

It will be noted in the above examples that the six substrates used to produce the gaseous products were coated with a vinyl coating composition having a barium-cadmium stabilizer. To be certain that it was not the stabilizer of the coating composition that was releasing the undesired gaseous products, the above experiments were repeated by variously using lead, tin, and calcium-zinc stabilizers for the coating compositions that were used to coat such six substrates. In all of these experiments, substantially the same results were noted as in the above examples.

I claim:

1. In a heat fusion coating process requiring a post heating step for coating an article using a dry vinyl resin composition comprised of vinyl chloride homopolymer or copolymers thereof with other vinylic monomers, the improvement comprising including a stabilizer consisting essentially of a soluble organic tin compound which is a stabilizer for vinyl resins in said composition, in an amount effective to reduce sandiness in the heat-fused coating.

2. The method of claim 1 wherein the article to be coated is substantially fabricated from wire.

3. In a heat fusion coating process requiring a post heating step for coating an article using a vinyl resin composition comprised of polyvinyl chloride, copolymers of vinyl chloride, mixtures of polyvinyl chloride and vinyl chloride copolymers, or mixtures of these polymers with less than 20 percent of another resin, a method of reducing sandiness in a coating produced by said process comprising including a soluble organic tin compound which is a stabilizer for vinyl resins in said composition.

* * * * *